(12) United States Patent
Lao et al.

(10) Patent No.: US 7,974,508 B2
(45) Date of Patent: Jul. 5, 2011

(54) MULTI-LAYER STRUCTURE AND METHOD FOR MANUFACTURING THE SAME

(75) Inventors: Ieng Kin Lao, Taipa (MO); Visit Thaveeprungsriporn, Bangkok (TH)

(73) Assignee: Nitto Denko Corporation, Ibaraki, Osaka (JP)

(*) Notice: Subject to any disclaimer, the term of this patent is extended or adjusted under 35 U.S.C. 154(b) by 14 days.

(21) Appl. No.: 12/364,561

(22) Filed: Feb. 3, 2009

(65) Prior Publication Data

US 2010/0195951 A1 Aug. 5, 2010

(51) Int. Cl.
*G02B 6/10* (2006.01)
*G02B 6/12* (2006.01)
*G02B 6/43* (2006.01)

(52) U.S. Cl. ............... 385/131; 385/14; 385/31

(58) Field of Classification Search .............. None
See application file for complete search history.

(56) References Cited

U.S. PATENT DOCUMENTS

| | | | |
|---|---|---|---|
| 5,177,352 A | 1/1993 | Carson et al. | |
| 5,802,222 A | 9/1998 | Rasch et al. | |
| 6,011,885 A | 1/2000 | Dempewolf et al. | |
| 7,038,235 B2 | 5/2006 | Seitz | |
| 7,228,022 B1 | 6/2007 | Bramson et al. | |
| 7,250,317 B2 | 7/2007 | Heideman | |
| 7,267,931 B2 | 9/2007 | Mune et al. | |
| 7,437,033 B1* | 10/2008 | Efimov | 385/36 |
| 7,515,803 B2* | 4/2009 | Hirao et al. | 385/129 |
| 2003/0007736 A1* | 1/2003 | Harada | 385/49 |
| 2005/0130073 A1 | 6/2005 | Mune et al. | |
| 2007/0081758 A1 | 4/2007 | Tono et al. | |
| 2009/0135391 A1* | 5/2009 | Arora et al. | 355/67 |

FOREIGN PATENT DOCUMENTS

| | | |
|---|---|---|
| EP | 0 986 197 A2 | 3/2000 |
| EP | 1 376 697 A1 | 1/2004 |
| EP | 1662279 A1 | 5/2006 |
| EP | 1 930 755 A1 | 6/2008 |
| EP | 1939955 A | 7/2008 |
| WO | 2005015173 A | 2/2005 |
| WO | 2005103652 A | 11/2005 |
| WO | WO 2006/102917 A1 | 10/2006 |
| WO | 2007082045 A | 7/2007 |

OTHER PUBLICATIONS

Shinar R. et al., Structurally integrated organic light emitting device-based sensors for gas phase and dissolved oxygen, Analytica Chimica Acta 568, 2006, pp. 190-199.
Winnewisser C., Polymer Optoelectronics, CSEM Basel, Jun. 25, 2008, pp. 1 -22.
International Search Report dated May 12, 2010.

* cited by examiner

*Primary Examiner* — Omar Rojas

(57) ABSTRACT

A multi-layer structure and a method for manufacturing the multi-layer structure are provided. The multi-layer structure includes: a waveguide including one or more light coupling regions having a refractive index gradient; at least one organic material based active optical element disposed above the waveguide; wherein the one or more light coupling regions is configured to change characteristics of light propagating in the waveguide; wherein at least one of the one or more light coupling regions is configured to enhance light coupling between the waveguide and the active optical element.

16 Claims, 13 Drawing Sheets

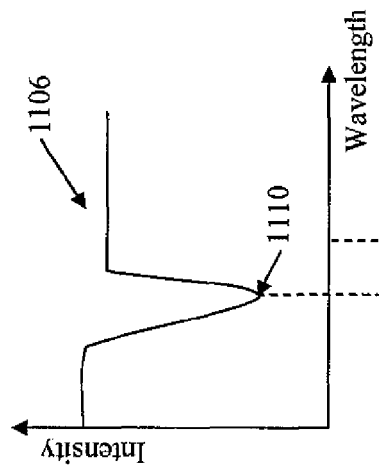
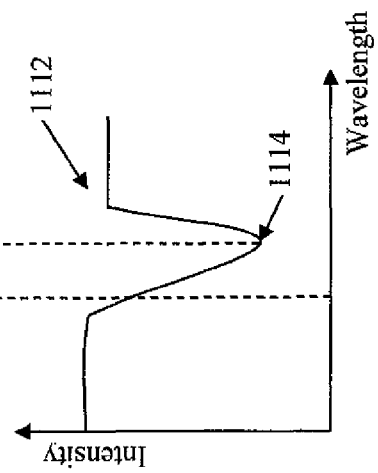
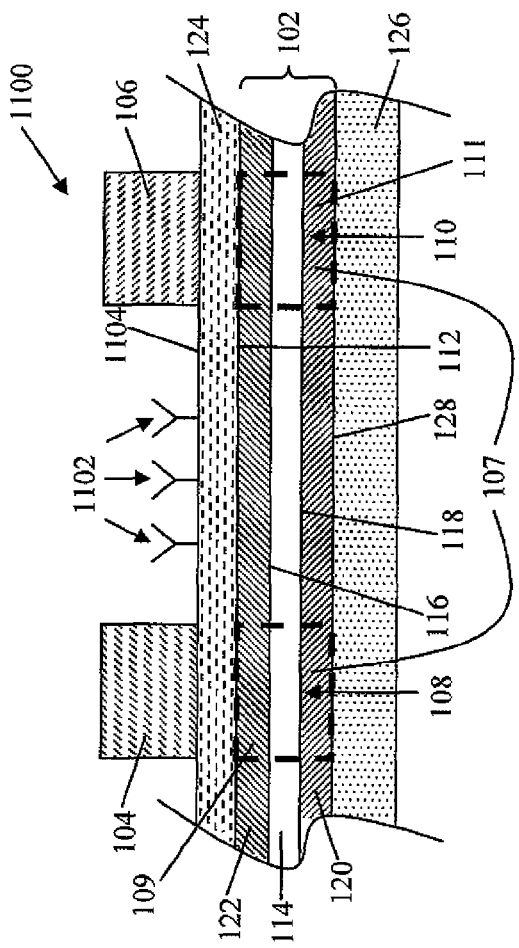
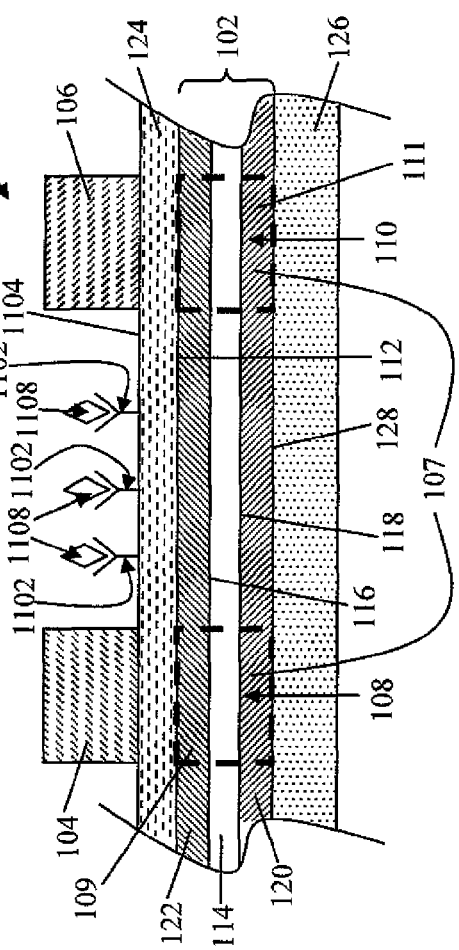

MULTI-LAYER STRUCTURE AND METHOD FOR MANUFACTURING THE SAME

TECHNICAL FIELD

Embodiments relate generally to a multi-layer structure and a method for manufacturing the multi-layer structure.

BACKGROUND

Generally, multi-layer structures are used for many various applications, e.g. implemented as sensors for physical and/or chemical and/or biological applications, etc. A conventional multi-layer structure usually includes various different components such as light sources, photo detectors, waveguides, etc.

Conventionally, inorganic materials are used for manufacturing the conventional multi-layer structures and also for manufacturing the light sources, the photo detectors and the waveguides. However, the conventional inorganic multi-layer structures may still have some limits on their performances.

SUMMARY

In an embodiment, there is provided a multi-layer structure, including a waveguide including one or more light coupling regions having a refractive index gradient; at least one organic material based active optical element disposed above the waveguide; wherein the one or more light coupling regions is configured to change characteristics of light propagating in the waveguide; wherein at least one of the one or more light coupling regions is configured to enhance light coupling between the waveguide and the active optical element.

In another embodiment, there is provided a method for manufacturing a multi-layer structure, the method including forming a waveguide including one or more light coupling regions having a refractive index gradient; forming at least one organic material based active optical element above the waveguide; wherein the one or more light coupling regions is configured to change characteristics of light propagating in the waveguide; wherein at least one of the one or more light coupling regions is configured to enhance light coupling between the waveguide and the active optical element.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 11(a) shows a schematic diagram of the multi-layer structure implemented as e.g. a biosensor according to an embodiment.

FIG. 11(b) shows a graph of intensity plotted against wavelength before antibody interacts with antigen according to an embodiment.

FIG. 11(c) shows a schematic diagram of the antibody on the biosensor interacting with the antigen according to an embodiment.

FIG. 11(d) shows a graph of intensity plotted against wavelength after the antibody interacts with the antigen according to an embodiment.

DETAILED DESCRIPTION

Exemplary embodiments of a multi-layer structure, a method of manufacturing the multi-layer structure, a waveguide and a method of manufacturing the waveguide are described in detail below with reference to the accompanying figures. It will be appreciated that the exemplary embodiments described below can be modified in various aspects without changing the essence of the invention.

Figure 1A:
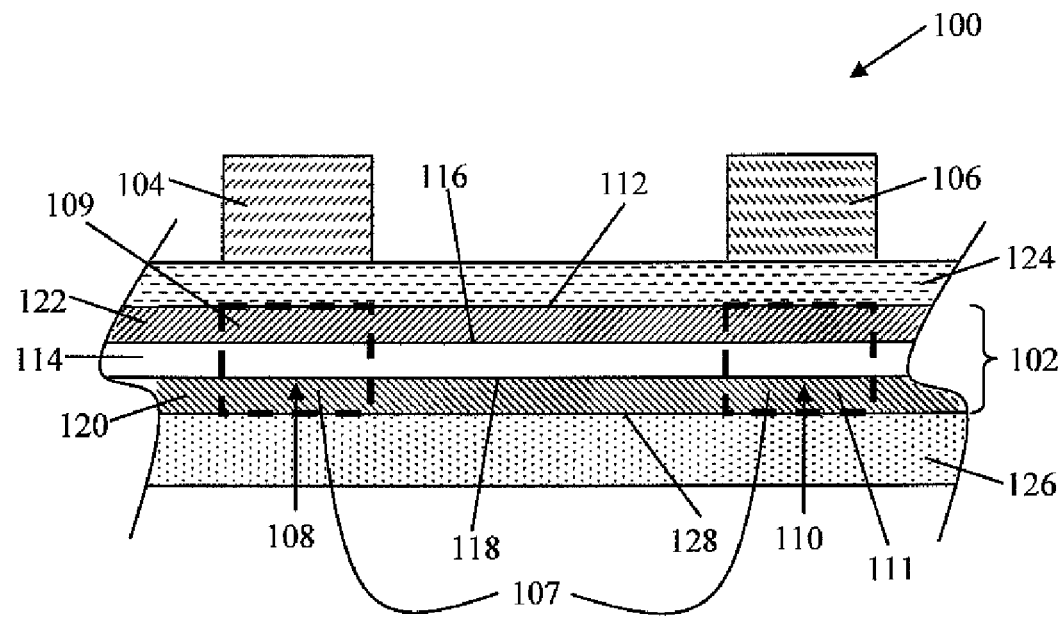
FIG. 1(a) shows a schematic diagram of a multi-layer structure according to an embodiment.

FIG. 1(a) shows a schematic diagram of a multi-layer structure 100 according to an embodiment. The multi-layer structure 100 may include a waveguide 102, at least one light source 104 and at least one photo detector 106. For illustration purposes, only one light source 104 and one photo detector 106 are shown in FIG. 1(a). In general, an arbitrary number of light sources 104 and photo detectors 106 may be provided monolithically integrated. By way of example, a plurality of light sources 104 and only one photo detector 106 may be provided. Alternatively, only one light source 104 and a plurality of photo detectors 106 may be provided. As another alternative embodiment, a plurality of light sources 104 and a plurality of photo detectors 106 may be provided monolithically integrated with one another. The waveguide 102 of the multi-layer structure 100 may be a planar waveguide. The waveguide 102 of the multi-layer structure 100 may include a light coupling arrangement 107. The light source 104 and the photo detector 106 may be disposed above the waveguide 102. The waveguide 102, the light source 104 and the photo detector 106 may include organic material. The organic materials for the waveguide 102 may include but are not limited to Polyethylene, Polypropylene, PVC, Polystyrene, Nylon, Polyester, Acrylics, Polyurethane, Polycarbonate, epoxy-based polymers and fluorene derivative polymers. The organic materials for the light source 104 may include but are not limited to phenyl-substituted poly(p-phenylenevinylene) (Ph-PPV). The organic materials for the photo detector 106 may include but are not limited to poly(3-hexythiophene):1-(3-methoxycarbonyl)-propyl-1-phenyl-(6,6) $C_{60}$ (P3HT:PCBM), $C_{60}$, ZnPC, and Pentacene. The waveguide 102, the light coupling arrangement 107, the light source 104 and the photo detector 106 may be monolithically integrated.

The light coupling arrangement 107 of the waveguide 102 may be substantially non-wavelength sensitive. The light coupling arrangement 107 may be substantially non-wavelength selective (in other words has an attenuation of the incoming optical signal that is negligible over a wide wavelength range, e.g. over the mentioned wavelength range(s)) in a wavelength range from 300 nm to 1700 nm.

To achieve non-wavelength selective light coupling, one of the methods is to generate refractive index (RI) gradient in the waveguide materials. On the basis of Snell's law ($n_1 \sin \theta_1 = n_2 \sin \theta_2$, where $n_1$ and $n_2$ are the refractive index for a first layer and a second layer respectively, $\theta_1$ is the incident angle and $\theta_2$ is refraction angle), the refraction angle of a light ray increases, and thus bending the light ray, when the light ray passes from a layer with higher RI to another layer with lower RI. Therefore, the reflection angle for the light emitted from the light source 104 is changed gradually and continuously when the light passes through a region having a RI gradient. As a result, the light emitted from the light source 104 can be non-wavelength selectively coupled to the waveguide 102. Another approach to achieve non-wavelength selective light coupling is to modify the incident angle of the light ray emitted from the light source 104 to the light coupling arrangement 107, and/or of the light propagated in the light coupling arrangement 107 to the photo detector 108 in order to make the light ray satisfying total internal reflection, i.e. the incident angle $\theta_1$>critical angle $\theta_c$. For example, this can be achieved through modifying the surface curvature of the interface between different materials having different refractive indexes, such as core and cladding materials, in the light coupling arrangement 107.

The light coupling arrangement 107 may include one or more first light coupling module 108 and one or more second light coupling module 110. For illustration purposes, only one first light coupling module 108 and one second light coupling module 110 are shown in FIG. 1(a). The first light coupling module 108 may include a region 109 having a refractive index gradient and the second light coupling module 110 may include a region 111 having a refractive index gradient.

In one embodiment, as shown in FIG. 1(a), the waveguide 102 may include one or more regions 109, 111 having the refractive index gradient. In another embodiment, the waveguide may include at least two regions 109, 111 having the refractive index gradient. The regions 109, 111 may be substantially non-wavelength selective (in other words has an attenuation of the incoming optical signal that is negligible over a wide wavelength range, e.g. over the mentioned wavelength range(s)) in a wavelength range from 300 nm to 1700 nm. The regions 109, 111 may be configured to couple light between the waveguide 102 and at least one optical element, e.g. the light source 104 or the photo detector 106. The regions 109, 111 may be configured to change characteristics of light propagating in the waveguide 102. The changes in the characteristics of light propagating in the waveguide may include but are not limited to changes in light propagation direction, convergence of light, focusing of light, diffraction of light, divergence of light and diffusion of light. Each region 109, 111 having the refractive index gradient may be disposed below the respective optical element, e.g. the light source 104 or the photo detector 106. The waveguide may include but is not limited to organic material. The organic materials for the waveguide 102 may include but are not limited to Polyethylene, Polypropylene, PVC, Polystyrene, Nylon, Polyester, Acrylics, Polyurethane, Polycarbonate, epoxy-based polymers and fluorene derivative polymers. The regions 109, 111 may include but are not limited to polymer, electro-opto organic materials and thermal-opto organic materials.

Figure 9:
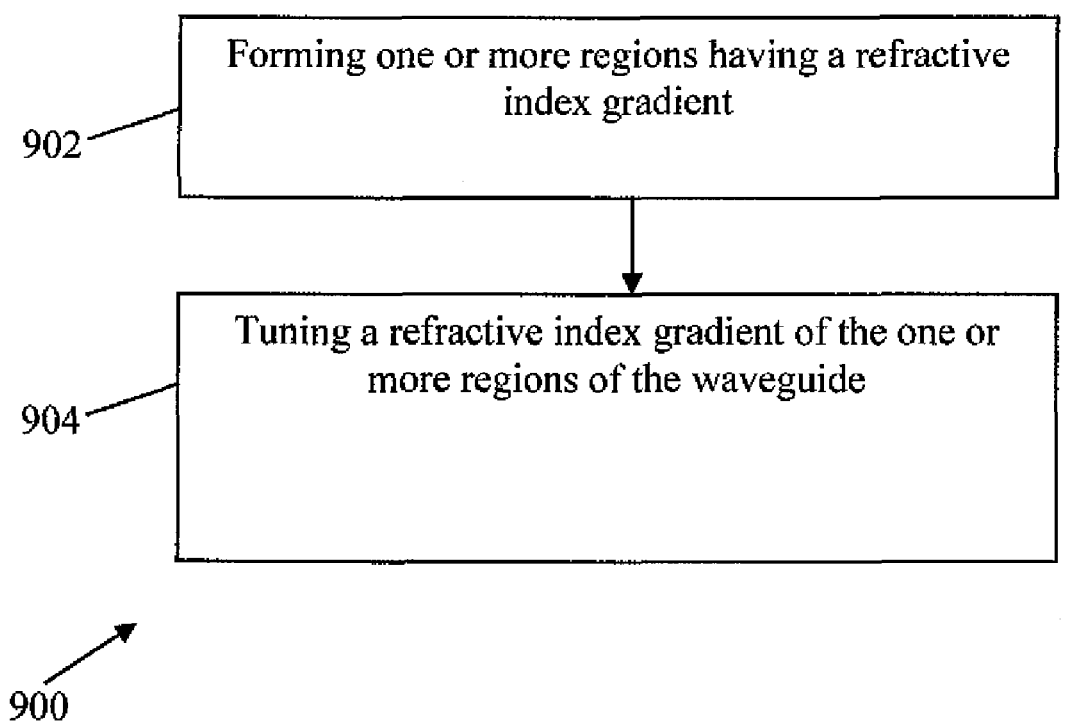
FIG. 9 shows a flowchart of a process of manufacturing the waveguide according to an embodiment.

FIG. 9 shows a flowchart 900 of a process of manufacturing the waveguide 102. At 902, one or more regions having a refractive index gradient may be formed. At 904, a refractive index gradient of the one or more regions of the waveguide may be tuned.

The refractive index gradient of the regions 109, 111 of the waveguide 102 may be tuned by emitting laser light to the waveguide 102, e.g. by laser direct writing of the waveguide 102. The refractive index (RI) of the waveguide materials may decrease after the waveguide materials are exposed to laser. A decrease of the refractive index of the waveguide materials may be proportional to the exposed energy dosage. A refractive index gradient can thus be generated by changing the exposed energy dosage from one direction to another direction along the regions 109, 111 of the waveguide 102, for example, from left to right or from bottom to top.

Figure 10:
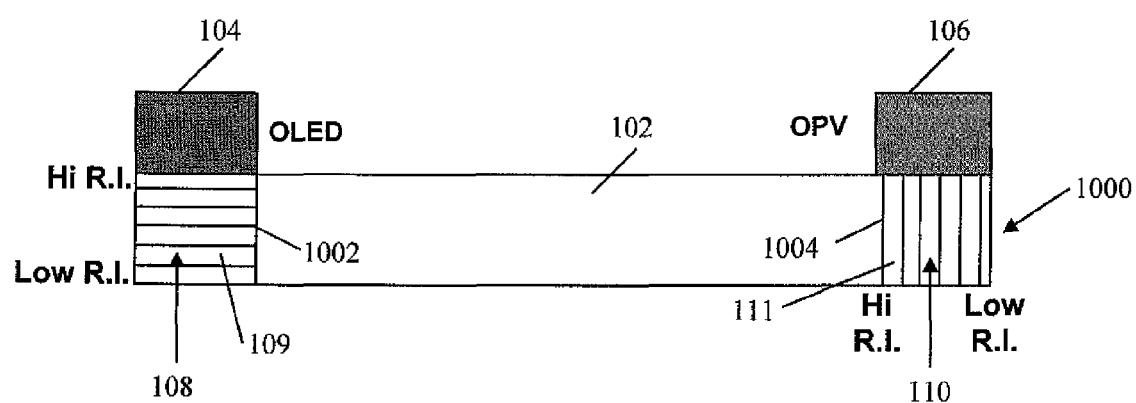
FIG. 10 shows an example design of a refractive index gradient of the waveguide according to an embodiment.

FIG. 10 shows an example design of the refractive index gradient 1000 of the waveguide 102. The refractive index 1002 of the region 109 of the first light coupling module 108 may decrease from top to bottom. The refractive index 1004 of the region 111 of the second light coupling module 110 may decrease from left to right. Other designs of the refractive index gradient can also be used in other embodiments.

Further, the refractive index gradient of the regions 109, 111 may be tuned by distributing different amounts of e.g. metal ions or nanoparticles along the regions 109, 111. The refractive index gradient of the regions 109, 111 may also be tuned by changing a degree of e.g. polymer cross-linking along the regions 109, 111. The refractive index gradient of the regions 109, 111 may also be tuned by changing molecular bonding of e.g. polymer along the regions 109, 111. The refractive index gradient of the regions 109, 111 may also be tuned by generating an electric field across e.g. electro-opto materials along the regions 109, 111. The refractive index gradient of the regions 109, 111 may also be tuned by generating a temperature gradient across e.g. thermal-opto materials along the regions 109, 111.

Referring back to FIG. 1(a), the light source 104 and the photo detector 106 may be disposed above a first surface 112 of the waveguide 102. The light source 104 and the photo detector 106 may be located at a distance from each other. In one embodiment, as shown in FIG. 1(a), the light source 104 may be disposed adjacent to the photo detector 106. The light source 104 may be disposed above the first light coupling module 108 and the photo detector 106 may be disposed above the second light coupling module 110. Further, the light source 104 and the photo detector 106 may also be arranged orthogonally to the waveguide 102.

Figure 1B:
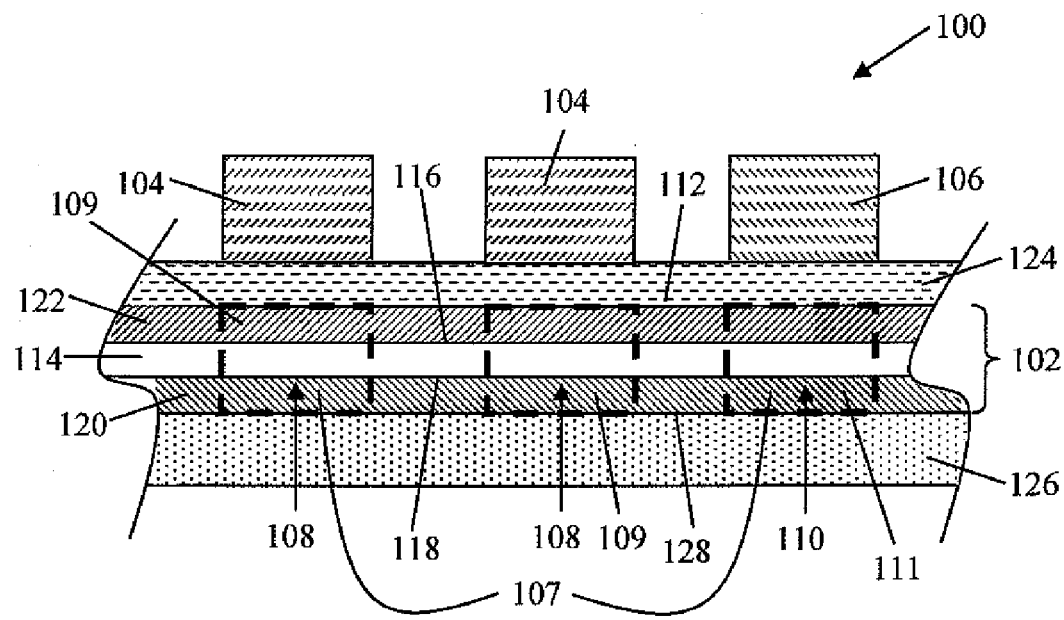
FIG. 1(b) shows a schematic diagram of another embodiment of the multi-layer structure of FIG. 1(a).
Figure 1C:
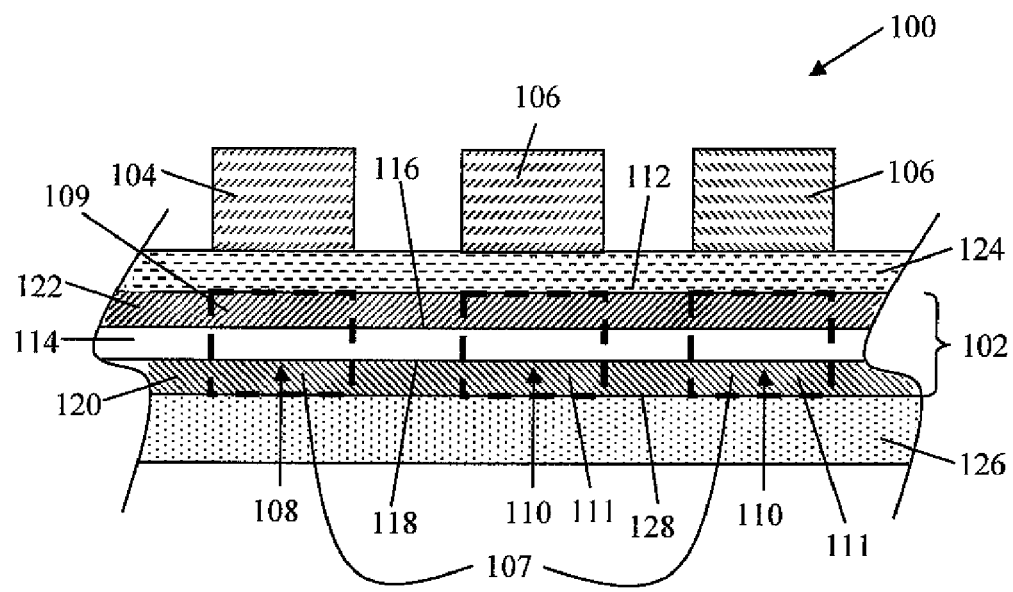
FIG. 1(c) shows a schematic diagram of another embodiment of the multi-layer structure of FIG. 1(a).

In another embodiment, as shown in FIG. 1(b), the light source 104 may be disposed adjacent to a further light source 104. The photo detector 106 may be disposed adjacent to the further light source 104. Each first light coupling module 108 may be disposed below the respective light source 104. The second light coupling module 110 may be disposed below the photo detector 106.

In another embodiment, as shown in FIG. 1(*c*), the light source 104 may be disposed adjacent the photo detector 106. The photo detector 106 may be disposed adjacent to a further photo detector 106. The first light coupling module 108 may be disposed below the light source 104. Each second light coupling module 110 may be disposed below the respective photo detector 106.

The waveguide 102 of the multi-layer structure 100 may have a core layer 114 having a first surface 116 facing the light source 104 and the photo detector 106, and a second surface 118 facing away from the light source 104 and the photo detector 106. The waveguide 102 may have a first cladding layer 120 disposed on the second surface 118 of the core layer 114. The waveguide 102 may further include a second cladding layer 122 disposed on the first surface 116 of the core layer 114. In other words, the waveguide 102 may have a multilayer structure. The core layer 114, the first cladding layer 120 and the second cladding layer 122 may have a same size.

The core layer 114, the first cladding layer 120 and the second cladding layer 122 may include but are not limited to polymer materials such as e.g. Polyethylene, Polypropylene, PVC, Polystyrene, Nylon, Polyester, Acrylics, Polyurethane, Polycarbonate, epoxy-based polymers and fluorene derivative polymers. The core layer 114 may have a larger refractive index than the first cladding layer 120. The core layer 114 may have a larger refractive index than the second cladding layer 122.

The first light coupling module 108, including the region 109 having the refractive index gradient, of the light coupling arrangement 107 may be configured to couple the light source 104 to the waveguide 102. The first light coupling module 108, including the region 109 having the refractive index gradient, may be configured to direct light emitted from the light source 104 to the waveguide 102. The first light coupling module 108, including the region 109 having the refractive index gradient, may also be configured to change an incident angle of the light emitted from the light source 104 to be larger than a critical angle for effecting total internal reflection in the core layer 114 of the waveguide 102.

In one embodiment, the first light coupling module 108 may include one or more of a grating coupler, a mirror and a lens. In another embodiment, the first light coupling module 108 may be a planar optical structure. The planar optical structure may include one or more structures such as lens made by metamaterials, photonic crystals and nanophotonics. In yet another embodiment, the first light coupling module 108 may be a three dimensional optical structure. The three dimensional optical structure may include one or more of a 45° mirror, a micro cavity, a volume grating, holographic optics and nanophotonics. The first light coupling module 108 may include one or more polymer materials, electro-opto organic materials, thermal-opto organic materials, metal oxides and metals.

The second light coupling module 110, including the region 111 having the refractive index gradient, of the light coupling arrangement 107 may be configured to couple the photo detector 106 to the waveguide 102. The second light coupling module 110, including the region 111 having the refractive index gradient, may be configured to direct light from the core layer 112 of the waveguide 102 to the photo detector 106.

In one embodiment, the second light coupling module 110 may include one or more of a grating coupler, a mirror and a lens. In another embodiment, the second light coupling module 110 may be a planar optical structure. The planar optical structure may include one or more structures such as lens made by metamaterials, photonic crystals and nanophotonics. In yet another embodiment, the second light coupling module 110 may be a three dimensional optical structure. The three dimensional optical structure may include one or more of a 45° mirror, a micro cavity, a volume grating, holographic optics and nanophotonics. The second light coupling module 110 may include one or more polymer materials, electro-opto organic materials, thermal-opto organic materials, metal oxides and metals.

In one embodiment, the first coupling module 108 and the second coupling module 110 may have the same structures. In another embodiment, the first coupling module 108 and the second coupling module 110 may have different structures.

The multi-layer structure 100 may further include a stacked layer 124 disposed on the first surface 112 of the waveguide 102. The stacked layer 124 may cover the first surface 112 of the waveguide 102. The stacked layer 124 may include one or more of a barrier layer, an adhesion layer and a spacer. The multi-layer structure 100 may also include a substrate 126 disposed on a second surface 128 of the waveguide 102 facing away from the light source 104 and the photo detector 106. The stacked layer 124 may be formed to prevent damage to the waveguide 102 when forming the light source 104 and the photo detector 106.

FIG. 1(*d*) shows a schematic diagram of another embodiment of the multi-layer structure 100 of FIG. 1(*a*). In this embodiment, the stacked layer 124 may be disposed between the light source 104 and the first light coupling module 108. The stacked layer 124 may be formed to prevent damage to the waveguide 102 when forming the light source 104. A further stacked layer 130 may be disposed on the first surface 112 of the waveguide 102. The further stacked layer 130 may be disposed between the photo detector 106 and the second light coupling module 110. The further stacked layer 130 may include one or more of a barrier layer, an adhesion layer and a spacer. The further stacked layer 130 may be formed to prevent damage to the waveguide 102 when forming the photo detector 106. As shown in FIG. 1(*b*), the stacked layer 124 and the further stacked layer 130 are located at a distance from one another (e.g. at two opposite ends of the waveguide 102).

FIG. 1(*e*) shows a schematic diagram of another embodiment of the multi-layer structure 100 of FIG. 1(*a*). FIG. 1(*f*) shows a schematic diagram of another embodiment of the multi-layer structure 100 of FIG. 1(*d*). In this embodiment the core layer 114 may have a smaller size than the first cladding layer 120 and the second cladding layer 122. The core layer 114 may have a shorter length and/or width as compared to the first cladding layer 120 and the second cladding layer 122. Further, the core layer 114 may have a same thickness as the first cladding layer 120 and the second cladding layer 122 in one embodiment. In another embodiment, the core layer 114 may have a different thickness as compared to the first cladding layer 120 and the second cladding layer 122. The second cladding layer 122 may cover the core layer 114. In other words, the core layer 114 may be enclosed by the first cladding layer 120 (from the bottom side) and the second cladding layer 122 (from the lateral sides and the top side).

In another embodiment, as shown in FIGS. 1(*g*) and 1(*h*), the core layer 114 may be enclosed by the first cladding layer 120 (from the bottom side and the lateral sides) and the second cladding layer 122 (from the top side).

The multi-layer structure 100 as described above may be an organic material based monolithically integrated optical board. The multi-layer structure 100 may be implemented for one or more of sensing, communication and data processing applications. The multi-layer structure 100 may be implemented for one or more of amplitude modulation detection, resonant frequency shift, frequency modulation detection, phase shifting modulation detection and polarization modulation detection. In one embodiment, the multi-layer structure 100 implemented for the various applications may have the same structures, materials, etc.

In some embodiments of the multi-layer structure 100, the stacked layer 124 and/or the further stacked layer 130 may not be included. In some embodiments of the multi-layer structure 100, the substrate 126 may not be included. In some embodiments of the multi-layer structure 100, the second cladding layer 122 may not be included. The second cladding layer 122 may not be included if the medium (e.g. ambient air) surrounding the core layer 114 has a lower refractive index than the core layer 114.

Figure 2:
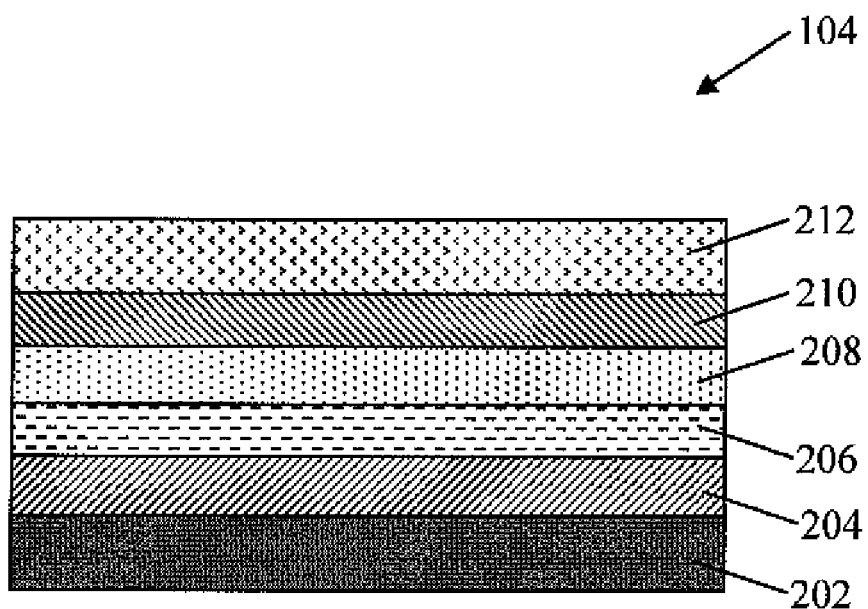
FIG. 2 shows a schematic diagram of a light source of the multi-layer structure according to an embodiment.

FIG. 2 shows a schematic diagram of the light source 104 of the multi-layer structure 100 according to an embodiment. The light source 104 may be an organic light emitting diode or an organic laser. The light source 104 may include a transparent conductive electrode 202 disposed above the first surface 112 of the waveguide 102, in particular e.g. disposed on the upper surface of the stacked layer 124 or the upper surface of the second cladding layer 122 or the upper surface of the core layer 114, depending on the respective structure that is provided. The transparent conductive electrode 202 may have a thickness of about 120 nm. The transparent conductive electrode 202 may also have a thickness ranging from about 50 nm to about 1 µm. A layer of transparent conductive polymer 204 may be disposed on the transparent conductive electrode 202. The layer of transparent conductive polymer 204 may have a thickness of about 80 nm. A light emissive layer 206 may be disposed on the layer of transparent conductive polymer 204. The light emissive layer 206 may have a thickness of about 80 nm. The light emissive layer 206 may also have a thickness ranging from about 3 nm to about 300 nm. A layer of hole blocking or electron injection material 208 may be disposed on the light emissive layer 206. The layer of hole blocking or electron injection material 208 may have a thickness of about 1.5 nm. A layer of cathode interface material 210 may be disposed on the layer of hole blocking or electron injection material layer 208. The layer of cathode interface material 210 may have a thickness of about 5 nm. An electrical conductive electrode 212 may be disposed on the layer of cathode interface material 210. The electrical conductive electrode 212 may have a thickness of about 300 nm.

The transparent conductive electrode 202 of the light source 104 may include but is not limited to transparent conductive oxide. The transparent conductive electrode 202 may also include but is not limited to conductive metal oxide, conductive polymer and conductive metallic silicide on a condition that these materials are transparent for the light emitted from the light source 104. The light emissive layer 206 of the light source 104 may include one or more organic materials. The one or more organic materials of the light emissive layer 206 may include but are not limited to organic dye molecules and polymers. The light emissive layer 206 may include but is not limited to phenyl-substituted poly(p-phenylenevinylene) (Ph-PPV). The electrical conductive electrode 212 of the light source 104 may include but is not limited to cathode metal.

Figure 3:
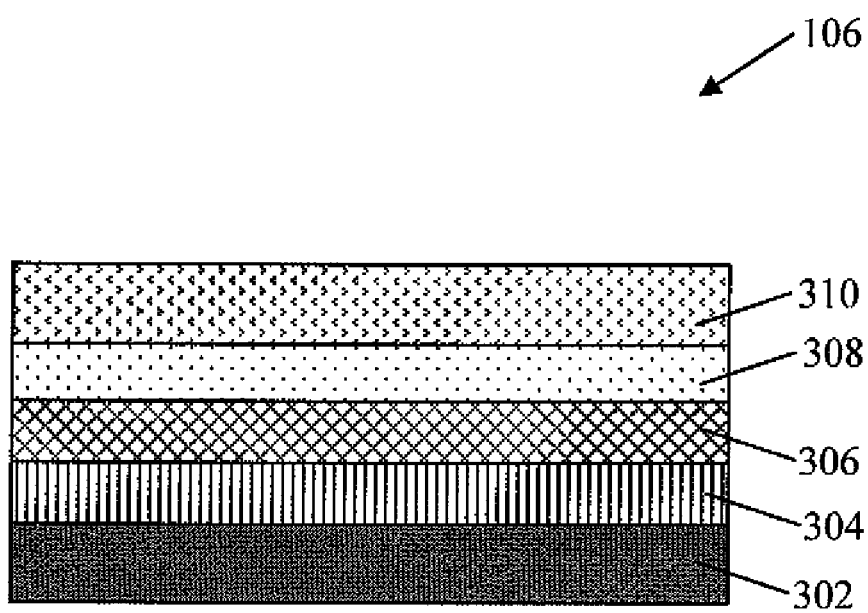
FIG. 3 shows a schematic diagram of a photo detector of the multi-layer structure according to an embodiment.

FIG. 3 shows a schematic diagram of the photo detector 106 of the multi-layer structure 100 according to an embodiment. The photo detector 106 may be an organic photovoltaic cell. The photo detector 106 may include a transparent conductive electrode 302 disposed above the first surface 112 of the waveguide 102, in particular e.g. disposed on the upper surface of the stacked layer 124 or upper surface of the further stacked layer 130, the upper surface of the second cladding layer 122 or the upper surface of the core layer 114, depending on the respective structure that is provided. The transparent conductive electrode 302 may have a thickness of about 120 nm. A layer of transparent conductive polymer 304 may be disposed on the transparent conductive electrode 302. The layer of transparent conductive polymer 304 may have a thickness of about 40 nm. A photovoltaic layer 306 may be disposed on the layer of transparent conductive polymer 304. The photovoltaic layer 306 may have a thickness of about 80 nm. The photovoltaic layer 306 may also have a thickness ranging from about 3 nm to about 300 nm. A layer of cathode interface material 308 may be disposed on the photovoltaic layer 306. The layer of cathode interface material 308 may have a thickness of about 5 nm. An electrical conductive electrode 310 may be disposed on the layer of cathode interface material 308. The electrical conductive electrode 310 may have a thickness of about 300 nm.

The transparent conductive electrode 302 of the photo detector 106 may include but is not limited to transparent conductive oxide. The transparent conductive electrode 302 may also include but is not limited to conductive metal oxide, conductive polymer and conductive metallic silicide on a condition that these materials are transparent for the light propagated in the waveguide 102. The photovoltaic layer 306 of the photo detector 106 may include one or more organic materials. The one or more organic materials of the photovoltaic layer 306 may include but are not limited to organic dye molecules and polymers. The photovoltaic layer 306 may also include but is not limited to poly(3-hexythiophene):1-(3-methoxycarbonyl)-propyl-1-phenyl-(6,6)$C_{60}$ (P3HT: PCBM), $C_{60}$, ZnPC, and Pentacene. Further, the photovoltaic layer 306 may be a multilayer structure including e.g. ZnPC/$C_{60}$, Pentacene/ZnPC/Pentacene/$C_{60}$, forming multiple heterojunction cells. The electrical conductive electrode 310 of the photo detector 106 may include but is not limited to cathode metal.

Figure 4:
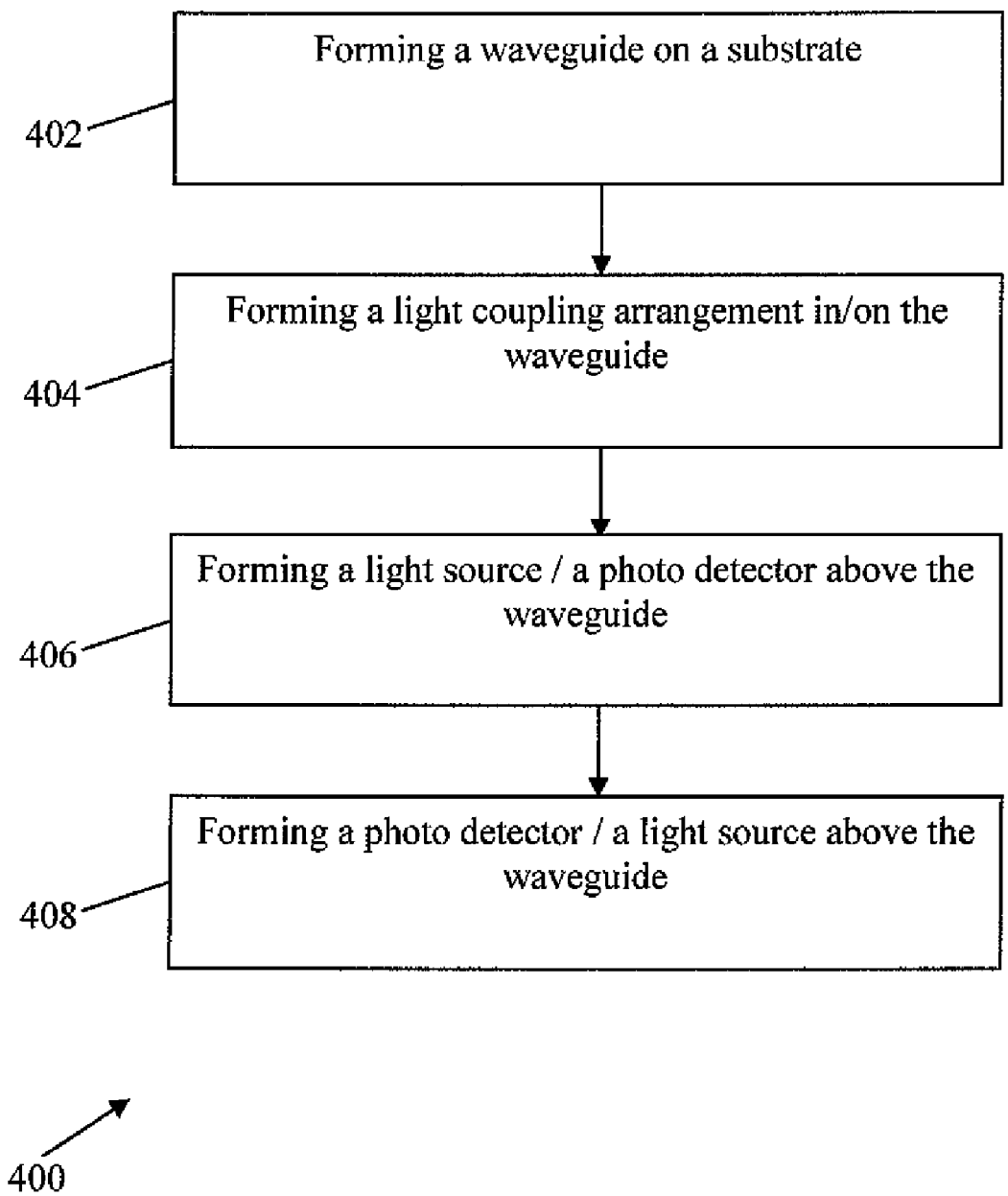
FIG. 4 shows a flowchart of a process of manufacturing the multi-layer structure according to an embodiment.

FIG. 4 shows a flowchart 400 of a process of manufacturing the multi-layer structure 100 according to an embodiment. At 402, a waveguide may be formed on a substrate. At 404, a light coupling arrangement may be formed in/on the waveguide. At 406, a light source may be formed above the waveguide. At 408, a photo detector may be formed above the waveguide. In another embodiment, the photo detector may be formed above the waveguide at 406 and the light source may be formed above the waveguide at 408.

Figure 1D:
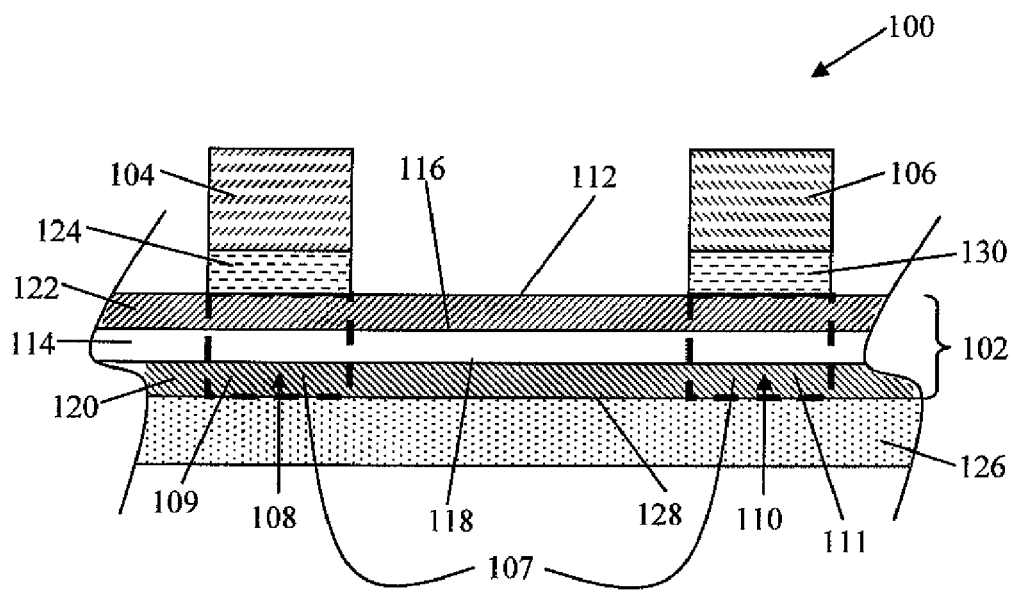
FIG. 1(d) shows a schematic diagram of another embodiment of the multi-layer structure of FIG. 1(a).
Figure 1E:
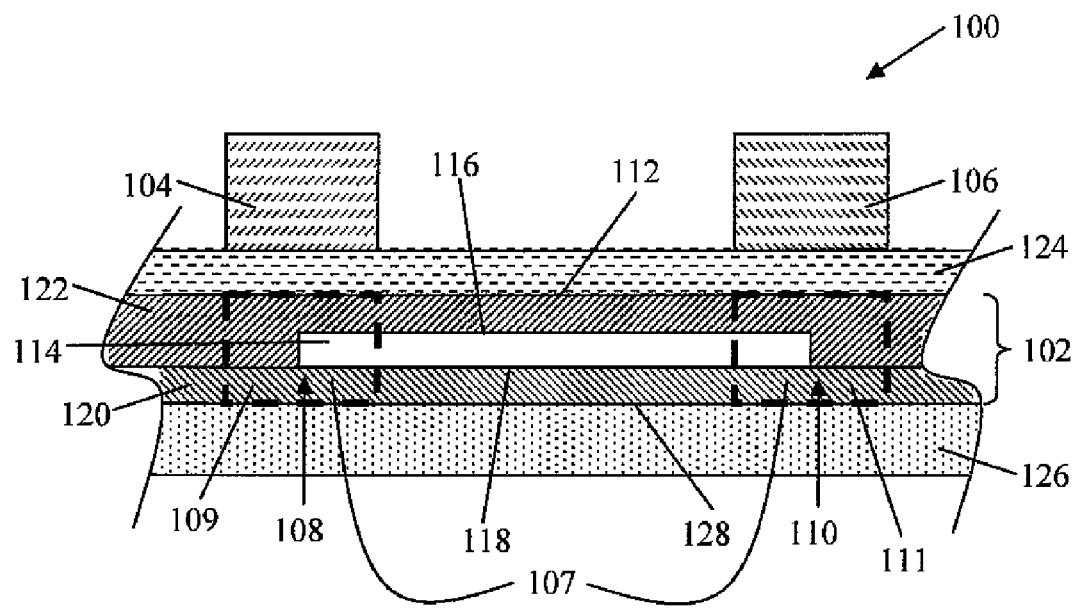
FIG. 1(e) shows a schematic diagram of another embodiment of the multi-layer structure of FIG. 1(a).
Figure 5:
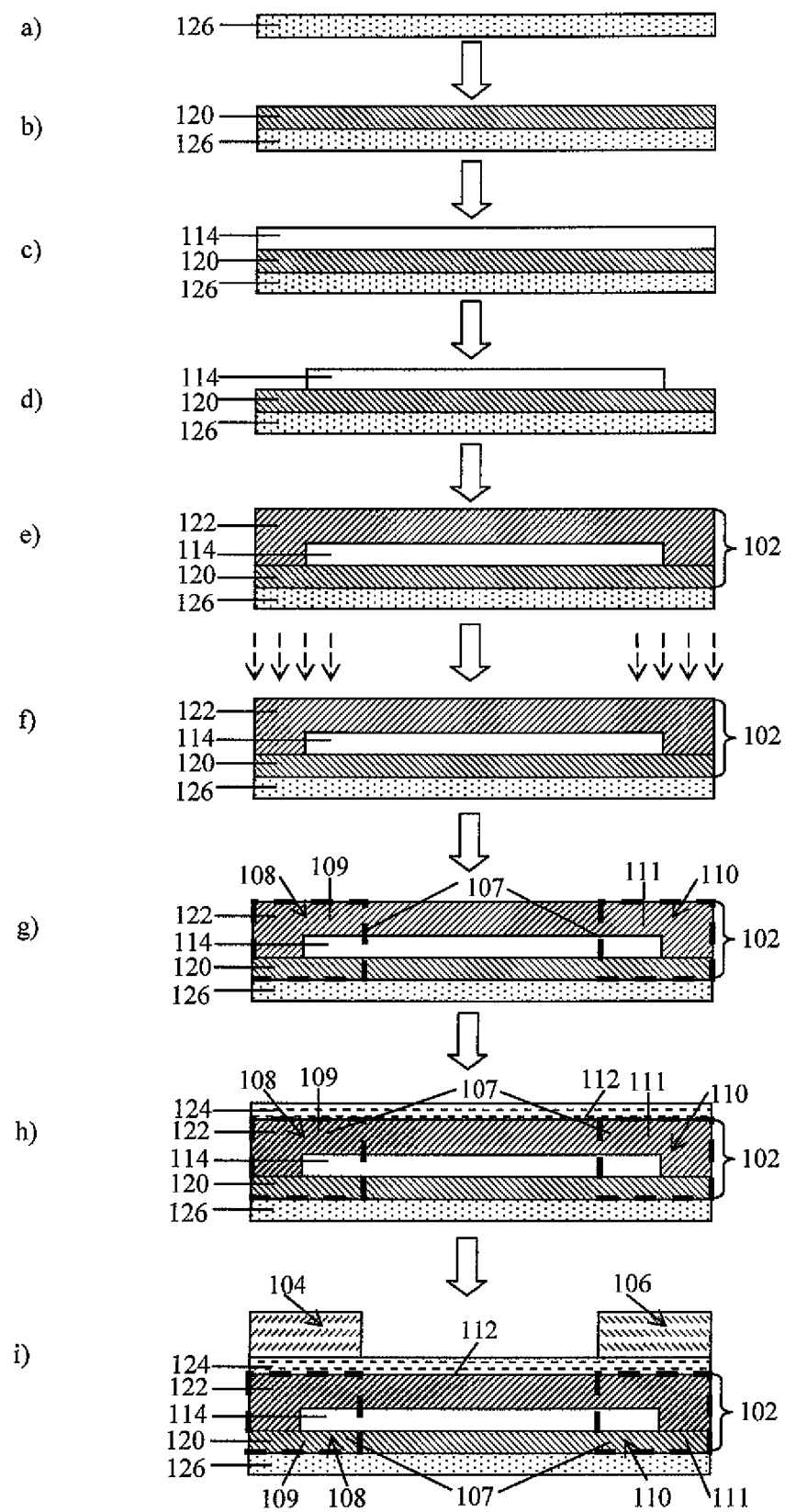
FIGS. 5(a)-5(i) shows a process of manufacturing the multi-layer structure of FIG. 1(c) according to an embodiment.

FIG. 5 shows a process of manufacturing the multi-layer structure 100 of FIG. 1(e) according to an embodiment. The multi-layer structure 100 may be manufactured in a batch manner or in a roll-to-roll continuous manner.

FIG. 5(a) shows a substrate 126. The substrate 126 may include but is not limited to silicon, glass, stainless steel foil, and plastics. The substrate 126 may be a multilayer substrate.

FIG. 5(b) shows a first cladding layer 120 of a waveguide 102 formed on the substrate 126. The first cladding layer 120 may be formed by coating or printing the first cladding layer 120, soft baking the first cladding layer 120, exposing the first cladding layer 120 to ultraviolet light, and curing the first cladding layer 120. The first cladding layer 120 may have a thickness of about 5 µm. The first cladding layer 120 may include but is not limited to epoxy-based polymer.

FIG. 5(c) shows a core layer 114 formed on the first cladding layer 120. The core layer 114 may be formed by coating or printing the core layer 114, soft baking the core layer 114, exposing the core layer 114 to ultraviolet light, and curing the core layer 114. The core layer 114 may have a thickness of about 5 μm. The core layer 114 may include but is not limited to epoxy-based polymer.

FIG. 5(d) shows that the core layer 114 is etched, e.g. using a lithographic process and a corresponding patterning process. The core layer 114 may have a smaller size than the first cladding layer 120. The core layer 114 may have a shorter length and/or width than the first cladding layer 120. For example, the first cladding layer 120 may have a width ranging from about 4 mm to about 10 mm and a length ranging from about 10 mm to about 30 mm, while the core layer 114 may have a width of about 5 μm and a length ranging from about 5 mm to about 20 mm. Further, the core layer 114 may have a same thickness as the first cladding layer 120 in one embodiment. For example, the core layer 114 may have a thickness of about 5 μm and the first cladding layer may have a thickness of about 5 μm. In another embodiment, the core layer 114 may have a different thickness as compared to the first cladding layer 120.

FIG. 5(e) shows a second cladding layer 122 formed on the core layer 114. The second cladding layer 122 may be formed by coating or printing the second cladding layer 122, soft baking the second cladding layer 122, exposing the second cladding layer 122 to ultraviolet light, and curing the second cladding layer 122. The second cladding layer 122 may have a depth of about 5 μm for covering the core layer 114. The second cladding layer 122 may include but is not limited to epoxy-based polymer. The core layer 114 may have a smaller size than the second cladding layer 122. The core layer 114 may have a shorter length and/or width than the second cladding layer 122. For example, the second cladding layer 114 may have a width ranging from about 4 mm to 10 mm and a length ranging from about 10 mm to about 30 mm, while the core layer 114 may have a width of about 5 μm and a length ranging from about 5 mm to about 20 mm. Further, the core layer 114 may have a same thickness as the depth of the second cladding layer 122 in one embodiment. For example, the core layer 114 may have a thickness of about 5 μm and the second cladding layer may have a depth of about 5 μm. In another embodiment, the core layer 114 may have a different thickness as compared to the depth of the second cladding layer 122. The second cladding layer 122 may cover the core layer 114. In other words, the core layer 114 may be enclosed by the first cladding layer 120 (from the bottom side) and the second cladding layer 122 (from the lateral sides and the top side).

The core layer 114, the first cladding layer 120 and the second cladding layer 122 form the waveguide 102. The core layer 114, the first cladding layer 120 and the second cladding layer 122 of the waveguide 102 may also include but are not limited to polymer materials such as e.g. Polyethylene, Polypropylene, PVC, Polystyrene, Nylon, Polyester, Acrylics, Polyurethane, Polycarbonate, epoxy-based polymer and fluorene derivative polymer.

FIG. 5(f) shows forming one or more regions 109, 111 having a refractive index gradient on portions of the waveguide 102. A refractive index gradient of the waveguide 102 may be tuned to form a light coupling arrangement 107 in the waveguide 102, as shown in FIG. 5(g). The light coupling arrangement 107 may be substantially non-wavelength selective (in other words has an attenuation of the incoming optical signal that is negligible over a wide wavelength range, e.g. over the mentioned wavelength range(s)) in a wavelength range from 300 nm to 1700 nm.

As described above, to achieve non-wavelength selective light coupling, one of the methods is to generate refractive index (RI) gradient in the waveguide materials. On the basis of Snell's law ($n_1 \sin \theta_1 = n_2 \sin \theta_2$, where $n_1$ and $n_2$ are the refractive index for a first layer and a second layer respectively, $\theta_1$ is the incident angle and $\theta_2$ is refraction angle), the refraction angle of a light ray increases, and thus bending the light ray, when the light ray passes from a layer with higher RI to another layer with lower RI. Therefore, the reflection angle for the light emitted from the light source 104 is changed gradually and continuously when the light passes through a region having a RI gradient. As a result, the light emitted from the light source 104 can be non-wavelength selectively coupled to the waveguide 102. Another approach to achieve non-wavelength selective light coupling is to modify the incident angle of the light ray emitted from the light source 104 to the light coupling arrangement 107, and/or of the light propagated in the light coupling arrangement 107 to the photo detector 108 in order to make the light ray satisfying total internal reflection, i.e. the incident angle $\theta_1$ > critical angle $\theta_c$. For example, this can be achieved through modifying the surface curvature of the interface between different materials having different refractive indexes, such as core and cladding materials, in the light coupling arrangement 107.

The refractive index gradient of the regions 109, 111 of the waveguide 102 may be tuned by emitting laser light to the waveguide 102, e.g. by laser direct writing of the waveguide 102. The refractive index (RI) of the waveguide materials may decrease after the waveguide materials are exposed to laser. A decrease of the refractive index of the waveguide materials may be proportional to the exposed energy dosage. A refractive index gradient can thus be generated by changing the exposed energy dosage from one direction to another direction along the regions 109, 111 of the waveguide 102, for example, from left to right or from bottom to top.

Further, the refractive index gradient of the regions 109, 111 may be tuned by distributing different amounts of e.g. metal ions or nanoparticles along the regions 109, 111. The refractive index gradient of the regions 109, 111 may also be tuned by changing a degree of e.g. polymer cross-linking along the regions 109, 111. The refractive index gradient of the regions 109, 111 may also be tuned by changing molecular bonding of e.g. polymer along the regions 109, 111. The refractive index gradient of the regions 109, 111 may also be tuned by generating an electric field across e.g. electro-opto materials along the regions 109, 111. The refractive index gradient of the regions 109, 111 may also be tuned by generating a temperature gradient across e.g. thermal-opto materials along the regions 109, 111.

As shown in FIG. 5(g), the light coupling arrangement 107 may include one or more first light coupling module 108 and one or more second light coupling module 110. For illustration purposes, only one first light coupling module 108 and one second light coupling module 110 are shown in FIG. 1(a). The first light coupling module 108 may include a region 109 having a refractive index gradient and the second light coupling module 110 may include a region 111 having a refractive index gradient.

In one embodiment, the waveguide 102 may include one or more regions 109, 111 having the refractive index gradient. In another embodiment, the waveguide may include at least two regions 109, 111 having the refractive index gradient. The regions 109, 111 may be substantially non-wavelength selective (in other words has an attenuation of the incoming optical signal that is negligible over a wide wavelength range, e.g. over the mentioned wavelength range(s)) in a wavelength range from 300 nm to 1700 nm. The regions 109, 111 may be configured to couple light between the waveguide 102 and at least one optical element, e.g. the light source 104 or the photo detector 106. The regions 109, 111 may be configured to change characteristics of light propagating in the waveguide 102. The changes in the characteristics of light propagating in the waveguide may include but are not limited to changes in light propagation direction, convergence of light, focusing of light, diffraction of light, divergence of light and diffusion of light. Each region 109, 111 having the refractive index gradient may be disposed below the respective optical element, e.g. the light source 104 or the photo detector 106. The waveguide may include but is not limited to organic material. The organic materials for the waveguide 102 may include but are not limited to Polyethylene, Polypropylene, PVC, Polystyrene, Nylon, Polyester, Acrylics, Polyurethane, Polycarbonate, epoxy-based polymers and fluorene derivative polymers. The regions 109, 111 may include but are not limited to polymer, electro-opto organic materials and thermal-opto organic materials.

The first light coupling module 108 and the second light coupling module 110 may be located at a distance from each other (e.g. may be formed at two opposite ends of the waveguide 102) so that the light emitted by the light source 104 may be received by the first light coupling module 108 (including the region 109 having the refractive index gradient) and input into an input side of the waveguide 102 (which is optically coupled with the first light coupling module 108), which in turn transmits the input light to an output side of the waveguide 102, which is optically coupled with the second light coupling module 110 (including the region 111 having the refractive index gradient). The second light coupling module 110, including the region 109 having the refractive index gradient, may receive the light from the waveguide 102 and transmit it to the photo detector 106, which will be described in more detail below.

FIG. 5(h) shows a stacked layer 124 deposited on a first surface 112 of the waveguide 102. The stacked layer 124 may cover the first surface 112 of the waveguide 102. The stacked layer 124 may include one or more of a barrier layer, an adhesion layer and a spacer. The stacked layer 124 may be formed to prevent damage to the waveguide 102 when forming the light source 104 and the photo detector 106. The stacked layer 124 may have a thickness ranging from about 10 nm to about 1 mm. The stacked layer 124 may include but is not limited to silicon dioxide, silicon nitride, silicon oxynitride, silicon carbide, quartz, transparent metal oxide, transparent polymer such as polyethylene terephthalate (PET), Su-8, polydimethylsioxane (PDMS) on a condition that these materials are transparent to the light emitted from the light source 104.

FIG. 5(i) shows a light source 104 and a photo detector 106 formed above the waveguide 102. For illustration purposes, only one light source 104 and one photo detector 106 are shown. More than one light source 104 and more than one photo detector 106 can be formed above the waveguide 102. The light source 104, the photo detector 106 and the waveguide 102 may include but are not limited to organic material. The waveguide 102, the light coupling arrangement 107, the light source 104 and the photo detector 106 may be monolithically integrated. The light source 104 and the photo detector 106 may be disposed above the first surface 112 of the waveguide 102. The light source 104 may be disposed above the first light coupling module 108 (including the region 109 having the refractive index gradient) and the photo detector 106 may be disposed above the second light coupling module 110 (including the region 111 having the refractive index gradient). The light source 104 and the photo detector 106 may also be arranged orthogonally to the waveguide 102.

The light source 104 and the photo detector 106 may be manufactured using any of several different processes. Details of three such processes are described below.

Figure 6:
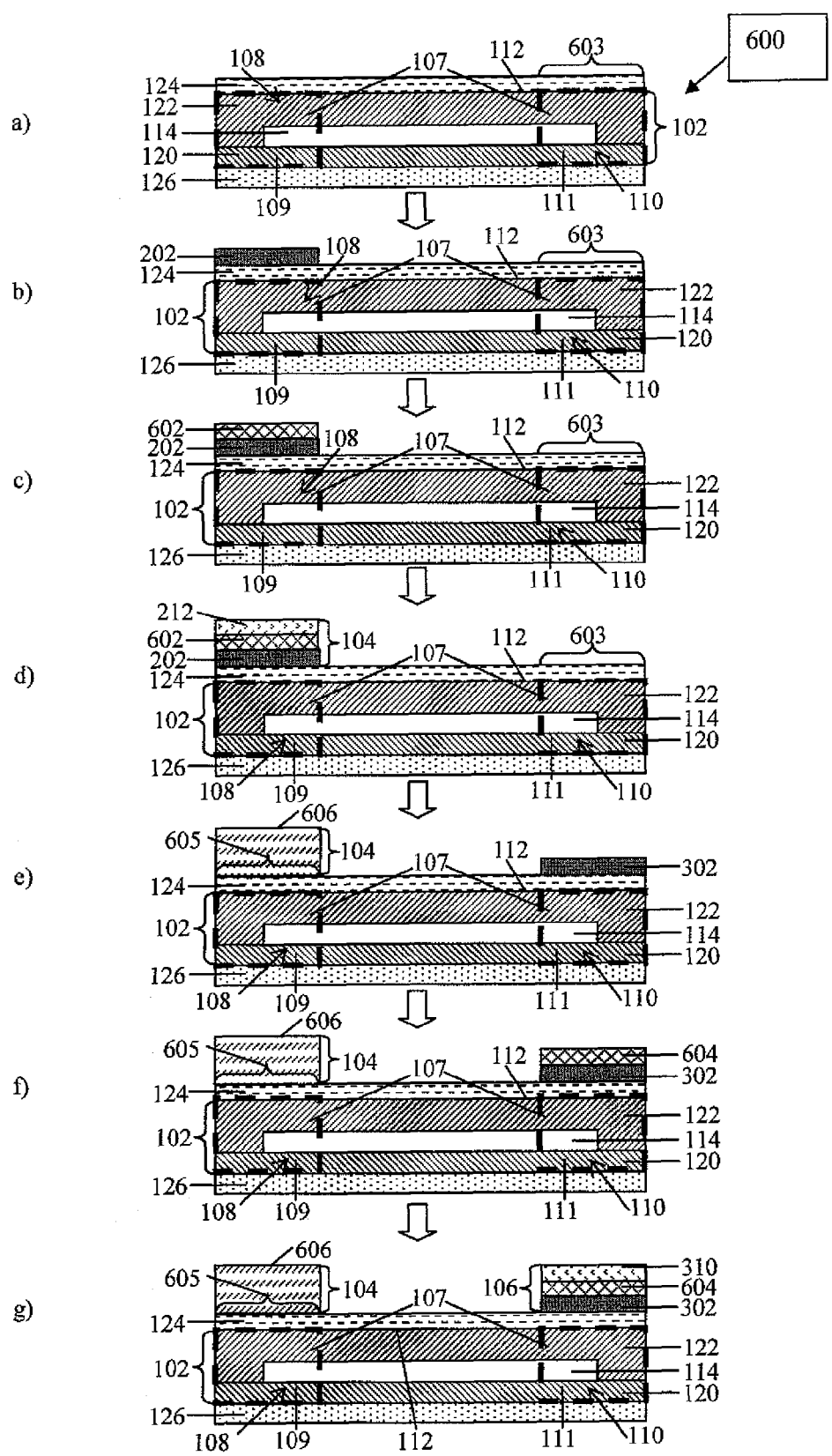
FIGS. 6(a)-6(g) shows a first process of manufacturing the light source and the photo detector according to an embodiment.

FIG. 6 shows a first process of manufacturing the light source 104 and the photo detector 106 according to an embodiment. In a first process, the light source 104 may be formed before the photo detector 106.

FIG. 6(a) shows a structure 600 of the substrate 126, the waveguide 102 and the stacked layer 124. FIG. 6(b) shows a transparent conductive electrode 202 of the light source 104 deposited above the first surface 112 of the waveguide 102 (e.g. on the stacked layer 124). The transparent conductive electrode 202 of the light source 104 may have a thickness of about 120 nm. The transparent conductive electrode 202 may have a thickness ranging from about 50 nm to about 1 μm. The transparent conductive electrode 202 of the light source 104 may include but is not limited to transparent conductive oxide. The transparent conductive electrode 202 may also include but is not limited to conductive metal oxide, conductive polymer and conductive metallic silicide on a condition that these materials are transparent for the light emitted from the light source 104.

FIG. 6(c) shows a first layer 602 formed on the transparent conductive electrode 202 of the light source 104. The first layer 602 may be formed by one or more of coating, printing, inkjet printing and/or physical deposition. The first layer 602 may also be cured. The first layer 602 may have a stack of materials. The stack of materials of the first layer 602 may include one or more of light emissive material 206, transparent conductive polymer 204, hole blocking or electron injection material 208, and/or cathode interface material 210. The layer of transparent conductive polymer 204 may have a thickness of about 80 nm. The layer of transparent conductive polymer 204 may include but is not limited to poly(3,4-ethylenedioxythiophene):poly(styrenesulfonic acid) (PEDOT:PSS). The light emissive layer 206 may have a thickness of about 80 nm. The light emissive layer 206 may also have a thickness ranging from about 3 nm to about 300 nm. The light emissive material 206 may include one or more organic materials. The one or more organic materials of the light emissive material 206 may include but are not limited to organic dye molecules and polymers. The light emissive layer 206 may include but is not limited to phenyl-substituted poly(p-phenylenevinylene) (Ph-PPV). The layer of hole blocking or electron injection material 208 may have a thickness of about 1.5 nm. The layer of hole blocking or electron injection material 208 may include but is not limited to lithium fluoride. The layer of cathode interface material 210 may have a thickness of about 5 nm. The layer of cathode interface material 210 may include but is not limited to calcium.

FIG. 6(d) shows an electrical conductive electrode 212 deposited on the first layer 602. The electrical conductive electrode 212 may have a thickness of about 300 nm. The electrical conductive electrode 212 may include but is not limited to cathode metal. The electrical conductive electrode 212 may include but is not limited to conductive metal oxide, conductive polymer and conductive metallic silicide. The transparent conductive electrode 202, the first layer 602 and the electrical conductive electrode 212 may form the light source 104.

During the processes described above and shown in FIGS. 6(a) to 6(d), a surface portion 603 of the stack layer 124, in which the photo detector 106 should be formed, may be masked so that the deposition of any material provided for the formation of the light source 102 may be prevented therein.

FIG. 6(e) shows a transparent conductive electrode 302 of the photo detector 106 deposited above the first surface 112 of the waveguide 102 (e.g. on the stacked layer 124). The transparent conductive electrode 302 of the photo detector 106 may have a thickness of about 120 nm. The transparent conductive electrode 302 may include but is not limited to transparent conductive oxide. The transparent conductive electrode 302 may include but is not limited to conductive metal oxide, conductive polymer and conductive metallic silicide on a condition that these materials are transparent to the light propagated in the waveguide 102.

FIG. 6(f) shows a second layer 604 formed on the transparent conductive electrode 302 of the photo detector 106. The second layer 604 of the photo detector 106 may be formed by one or more of coating, printing, inkjet printing and/or physical deposition. The second layer 604 may also be cured. The second layer 604 may have a stack of materials. The stack of materials of the second layer 604 may include one or more of photovoltaic material 306, transparent conductive polymer 304 and/or cathode interface material 308. The layer of transparent conductive polymer 304 may have a thickness of about 40 nm. The layer of transparent conductive polymer 304 may include but is not limited to poly(3,4-ethylenedioxythiophene):poly(styrenesulfonic acid) (PEDOT:PSS). The photovoltaic layer 306 may have a thickness of about 80 nm. The photovoltaic layer 306 may also have a thickness ranging from about 3 nm to about 300 nm. The photovoltaic material 306 may include one or more organic materials. The one or more organic materials of the photovoltaic material 306 may include but are not limited to organic dye molecules and polymers. The photovoltaic layer 306 may include but is not limited to poly(3-hexythiophene):1-(3-methoxycarbonyl)-propyl-1-phenyl-(6,6)$C_{60}$ (P3HT:PCBM), $C_{60}$, ZnPC, and Pentacene. Further, the photovoltaic layer 306 may be a multilayer structure including but not limiting to e.g. ZnPC/$C_{60}$, Pentacene/ZnPC/Pentacene/$C_{60}$, forming multiple heterojunction cells. The layer of cathode interface material 308 may have a thickness of about 5 nm. The layer of cathode interface material 308 may but is not limited to calcium.

FIG. 6(g) shows an electrical conductive electrode 310 deposited on the second layer 604 of the photo detector 106. The electrical conductive electrode 310 may have a thickness of about 300 nm. The electrical conductive electrode 310 of the photo detector 106 may include but is not limited to cathode metal. The electrical conductive electrode 310 may include but is not limited to conductive metal oxide, conductive polymer and conductive metallic silicide. The transparent conductive electrode 302, the second layer 604 and the electrical conductive electrode 310 may form the photo detector 106.

During the processes described above and shown in FIGS. 6(e) to 6(g), a surface portion 605 of the stack layer 124, in which the light source 102 has been formed, and an upper surface 606 of the light source 104 may be masked so that the deposition of any material provided for the formation of the photo detector 106 may be prevented therein.

Figure 7:
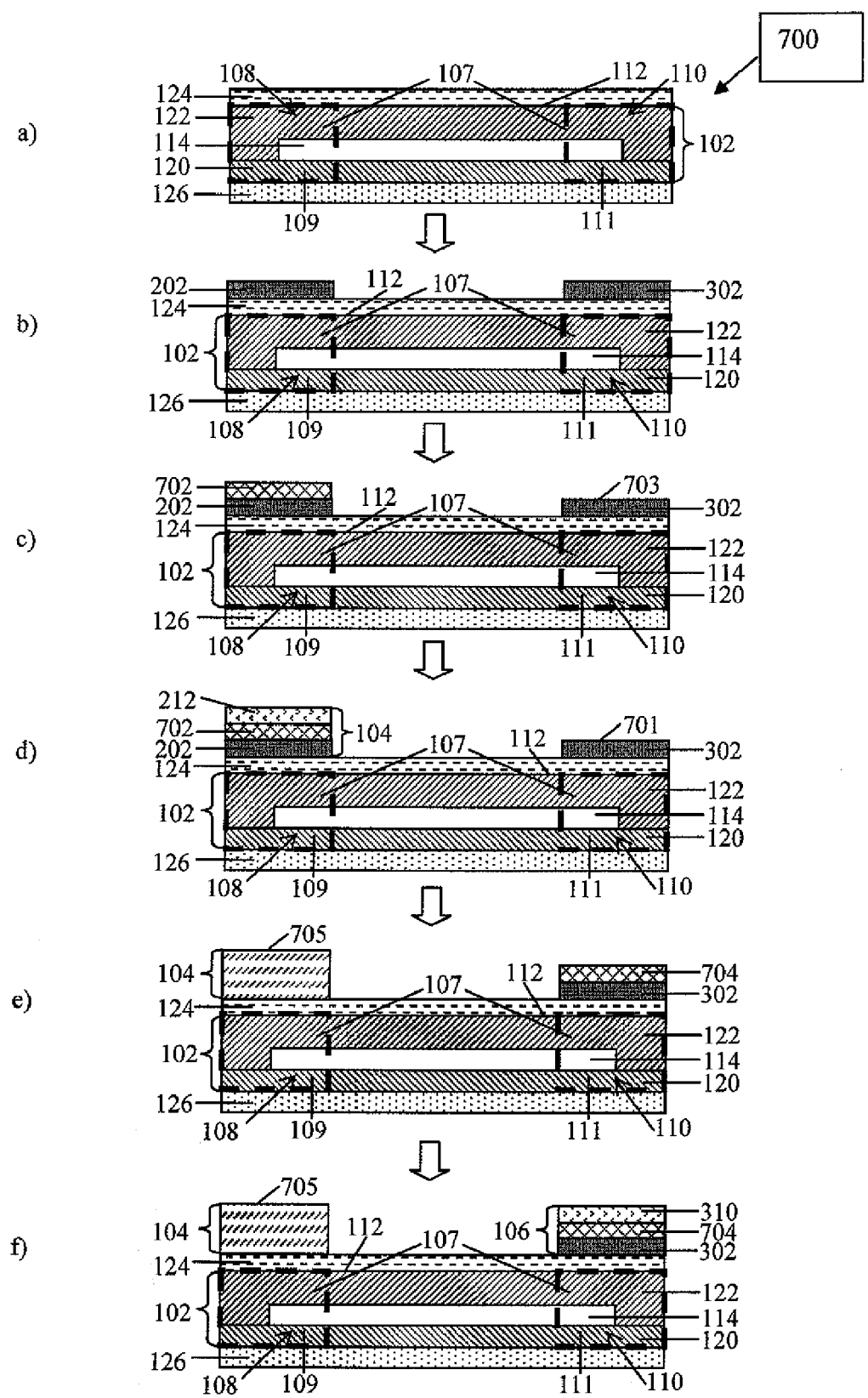
FIGS. 7(a)-7(f) shows a second process of manufacturing the light source and the photo detector according to an embodiment.

FIG. 7 shows a second process of manufacturing the light source 104 and the photo detector 106 according to an embodiment. In the second process, a transparent conductive electrode 202 of the light source 104 and a transparent conductive electrode 302 of the photo detector 106 may be deposited above the first surface 108 of the waveguide 102 simultaneously.

FIG. 7(a) shows a structure 700 of the substrate 126, the waveguide 102 and the stacked layer 124. FIG. 7(b) shows a transparent conductive electrode 202 of the light source 104 and a transparent conductive electrode 302 of the photo detector 106 deposited above the first surface 108 of the waveguide 102 (e.g. on the stacked layer 124) simultaneously. The transparent conductive electrode 202 of the light source 104 may have a thickness of about 120 nm. The transparent conductive electrode 202 may have a thickness ranging from about 50 nm to about 1 μm. The transparent conductive electrode 202 of the light source 104 may include but is not limited to transparent conductive oxide. The transparent conductive electrode 202 may also include but is not limited to conductive metal oxide, conductive polymer and conductive metallic silicide on a condition that these materials are transparent for the light emitted from the light source 104. The transparent conductive electrode 302 of the photo detector 106 may have a thickness of about 120 nm. The transparent conductive electrode 302 may include but is not limited to transparent conductive oxide. The transparent conductive electrode 302 may include but is not limited to conductive metal oxide, conductive polymer and conductive metallic silicide on a condition that these materials are transparent to the light propagated in the waveguide 102.

FIG. 7(c) shows a first layer 702 formed on the transparent conductive electrode 202 of the light source 104. The first layer 702 may be formed by one or more of coating, printing, inkjet printing and/or physical deposition. The first layer 702 may also be cured. The first layer 702 may have a stack of materials. The stack of materials of the first layer 702 may include one or more of light emissive material 206, transparent conductive polymer 204, hole blocking or electron injection material 208, and/or cathode interface material 210. The layer of transparent conductive polymer 204 may have a thickness of about 80 nm. The layer of transparent conductive polymer 204 may include but is not limited to poly(3,4-ethylenedioxythiophene):poly(styrenesulfonic acid) (PEDOT:PSS). The light emissive layer 206 may have a thickness of about 80 nm. The light emissive layer 206 may also have a thickness ranging from about 3 nm to about 300 nm. The light emissive material 206 may include one or more organic materials. The one or more organic materials of the light emissive material 206 may include but are not limited to organic dye molecules and polymers. The light emissive layer 206 may include but is not limited to phenyl-substituted poly(p-phenylenevinylene) (Ph-PPV). The layer of hole blocking or electron injection material 208 may have a thickness of about 1.5 nm. The layer of hole blocking or electron injection material 208 may include but is not limited to lithium fluoride. The layer of cathode interface material 210 may have a thickness of about 5 nm. The layer of cathode interface material 210 may include but is not limited to calcium. An upper surface 703 of the transparent conductive electrode 302 of the photo detector 106 may remain exposed, in other words, the upper surface 703 of the transparent conductive electrode 302 may be masked during the formation of the first layer 702 of the light source 104.

FIG. 7(d) shows an electrical conductive electrode 212 deposited on the first layer 702 of the light source 104. The electrical conductive electrode 212 may have a thickness of about 300 nm. The electrical conductive electrode 212 of the light source 104 may include but is not limited to cathode metal. The electrical conductive electrode 212 may include but is not limited to conductive metal oxide, conductive polymer and conductive metallic silicide. The transparent conductive electrode 202, the first layer 702 and the electrical conductive electrode 212 may form the light source 104. The upper surface 703 of the transparent conductive electrode 302 of the photo detector 106 may remain exposed, in other words, the upper surface 703 of the transparent conductive electrode 302 may be masked during the formation of the electrical conductive electrode 212 of the light source 104. Thus, with the end of this process, the light source 104 is completed.

FIG. 7(e) shows a second layer 704 formed on the transparent conductive electrode 302 of the photo detector 106. The second layer 704 of the photo detector 106 may be formed by one or more of coating, printing, inkjet printing and/or physical deposition. The second layer 704 may also be cured. The second layer 704 may have a stack of materials. The stack of materials of the second layer 704 may include one or more of photovoltaic material 306, transparent conductive polymer 304 and/or cathode interface material 308. The layer of transparent conductive polymer 304 may have a thickness of about 40 nm. The layer of transparent conductive polymer 304 may include but is not limited to poly(3,4-ethylenedioxythiophene):poly(styrenesulfonic acid) (PEDOT:PSS). The photovoltaic layer 306 may have a thickness of about 80 nm. The photovoltaic layer 306 may also have a thickness ranging from about 3 nm to about 300 nm. The photovoltaic material 306 may include one or more organic materials. The one or more organic materials of the photovoltaic material 306 may include but are not limited to organic dye molecules and polymers. The photovoltaic layer 306 may include but is not limited to poly(3-hexythiophene):1-(3-methoxycarbonyl)-propyl-1-phenyl-(6,6)$C_{60}$ (P3HT: PCBM), $C_{60}$, ZnPC, and Pentacene. Further, the photovoltaic layer 306 may be a multilayer structure including but not limiting to e.g. ZnPC/$C_{60}$, Pentacene/ZnPC/Pentacene/$C_{60}$, forming multiple heterojunction cells. The layer of cathode interface material 308 may have a thickness of about 5 nm. The layer of cathode interface material 308 may but is not limited to calcium. An upper surface 705 of the light source 104 just completed may remain exposed, in other words, the upper surface 705 of the light source 104 may be masked during the formation of the second layer 704 of the photo detector 106.

FIG. 7(f) shows an electrical conductive electrode 310 deposited on the second layer 704 of the photo detector 106. The electrical conductive electrode 310 may have a thickness of about 300 nm. The electrical conductive electrode 310 of the photo detector 106 may include but is not limited to cathode metal. The electrical conductive electrode 310 may include but is not limited to conductive metal oxide, conductive polymer and conductive metallic silicide. The transparent conductive electrode 302, the second layer 704 and the electrical conductive electrode 310 may form the photo detector 106. The upper surface 705 of the light source 104 may remain exposed, in other words, the upper surface 705 of the light source 104 may be masked during the formation of the electrical conductive electrode 310 of the photo detector 106.

Figure 8:
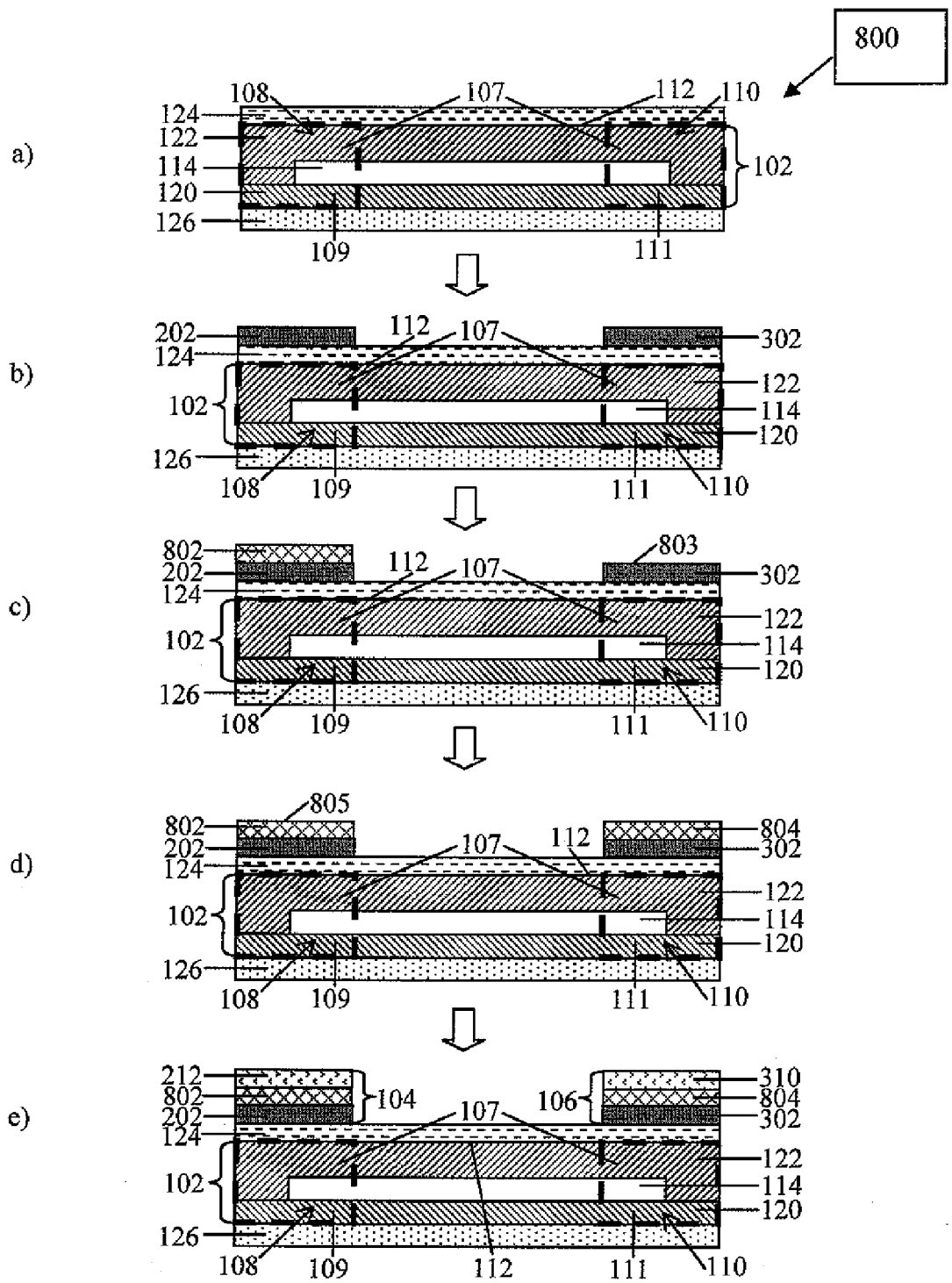
FIGS. 8(a)-8(e) shows a third process of manufacturing the light source and the photo detector according to an embodiment.

FIG. 8 shows a third process of manufacturing the light source 104 and the photo detector 106 according to an embodiment. In the third process, the light source 104 and the photo detector 106 may be formed simultaneously.

FIG. 8(a) shows a structure 800 of the substrate 126, the waveguide 102 and the stacked layer 124. FIG. 8(b) shows a transparent conductive electrode 202 of the light source 104 and a transparent conductive electrode 302 of the photo detector 106 deposited above the first surface 108 of the waveguide 102 (e.g. on the stacked layer 124) simultaneously. The transparent conductive electrode 202 of the light source 104 may have a thickness of about 120 nm. The transparent conductive electrode 202 may have a thickness ranging from about 50 nm to about 1 μm. The transparent conductive electrode 202 of the light source 104 may include but is not limited to transparent conductive oxide. The transparent conductive electrode 202 may also include but is not limited to conductive metal oxide, conductive polymer and conductive metallic silicide on a condition that these materials are transparent for the light emitted from the light source 104. The transparent conductive electrode 302 of the photo detector 106 may have a thickness of about 120 nm. The transparent conductive electrode 302 may include but is not limited to transparent conductive oxide. The transparent conductive electrode 302 may include but is not limited to conductive metal oxide, conductive polymer and conductive metallic silicide on a condition that these materials are transparent to the light propagated in the waveguide 102.

FIG. 8(c) shows a first layer 802 formed on the transparent conductive electrode 202 of the light source 104. The first layer 802 of the light source 104 may be formed by one or more of coating, printing, inkjet printing and/or physical deposition. The first layer 802 may also be cured. The first layer 802 may have a stack of materials. The stack of materials of the first layer 802 may include one or more of light emissive material 206, transparent conductive polymer 204, hole blocking or electron injection material 208, and/or cathode interface material 210. The layer of transparent conductive polymer 204 may have a thickness of about 80 nm. The layer of transparent conductive polymer 204 may include but is not limited to poly(3,4-ethylenedioxythiophene):poly(styrenesulfonic acid) (PEDOT:PSS). The light emissive layer 206 may have a thickness of about 80 nm. The light emissive layer 206 may also have a thickness ranging from about 3 nm to about 300 nm. The light emissive material 206 may include one or more organic materials. The one or more organic materials of the light emissive material 206 may include but are not limited to organic dye molecules and polymers. The light emissive layer 206 may include but is not limited to phenyl-substituted poly(p-phenylenevinylene) (Ph-PPV). The layer of hole blocking or electron injection material 208 may have a thickness of about 1.5 nm. The layer of hole blocking or electron injection material 208 may include but is not limited to lithium fluoride. The layer of cathode interface material 210 may have a thickness of about 5 nm. The layer of cathode interface material 210 may include but is not limited to calcium. An upper surface 803 of the transparent conductive electrode 302 of the photo detector 106 may remain exposed, in other words, the upper surface 803 of the transparent conductive electrode 302 may be masked during the formation of the first layer 802 of the light source 104.

FIG. 8(d) shows a second layer 804 formed on the transparent conductive electrode 302 of the photo detector 106. The second layer 804 of the photo detector 106 may be formed by one or more of coating, printing, inkjet printing and/or physical deposition. The second layer 804 may also be cured. The second layer 804 may have a stack of materials. The stack of materials of the second layer 804 may include one or more of photovoltaic material 306, transparent conductive polymer 304 and/or cathode interface material 308. The layer of transparent conductive polymer 304 may have a thickness of about 40 nm. The layer of transparent conductive polymer 304 may include but is not limited to poly(3,4-ethylenedioxythiophene):poly(styrenesulfonic acid) (PEDOT:PSS). The photovoltaic layer 306 may have a thickness of about 80 nm. The photovoltaic layer 306 may also have a thickness ranging from about 3 nm to about 300 nm. The photovoltaic material 306 may include one or more organic materials. The one or more organic materials of the photovoltaic material 306 may include but are not limited to organic dye molecules and polymers. The photovoltaic layer 306 may include but is not limited to poly(3-hexythiophene):1-(3-methoxycarbonyl)-propyl-1-phenyl-(6,6)$C_{60}$ (P3HT: PCBM), $C_{60}$, ZnPC, and Pentacene. Further, the photovoltaic layer 306 may be a multilayer structure including but not limiting to e.g. ZnPC/$C_{60}$, Pentacene/ZnPC/Pentacene/$C_{60}$, forming multiple heterojunction cells. The layer of cathode interface material 308 may have a thickness of about 5 nm. The layer of cathode interface material 308 may but is not limited to calcium. An upper surface 805 of the first layer 802 of the light source 104 may remain exposed, in other words, the upper surface 805 of the first layer 802 may be masked during the formation of the second layer 804 of the photo detector 106.

FIG. 8(e) shows an electrical conductive electrode 212 deposited on the first layer 802 of the light source 104 and an electrical conductive electrode 310 deposited on the second layer 804 of the photo detector 106 simultaneously. The electrical conductive electrode 212 of the light source 104 may have a thickness of about 300 nm. The electrical conductive electrode 212 may, but is not limited to include cathode metal. The electrical conductive electrode 212 may include but is not limited to conductive metal oxide, conductive polymer and conductive metallic silicide. The transparent conductive electrode 202, the first layer 802 and the electrical conductive electrode 212 may form the light source 104. The electrical conductive electrode 310 of the photo detector 106 may have a thickness of about 300 nm. The electrical conductive electrode 310 may include but is not limited to cathode metal. The electrical conductive electrode 310 may include but is not limited to conductive metal oxide, conductive polymer and conductive metallic silicide. The transparent conductive electrode 302, the second layer 804 and the electrical conductive electrode 310 may form the photo detector 106.

The processes for manufacturing different embodiments of the multi-layer structure 100 can be modified by a skilled person from the process as described above. For example, for manufacturing the multi-layer structure 100 of FIGS. 1(a) to 1(c) where the core layer 114, the first cladding layer 120 and the second cladding layer 122 may have a same size, the core layer 114 of the waveguide 102 may not be etched. The process may continue from FIG. 5(c) to FIG. 5(e).

Figure 1F:
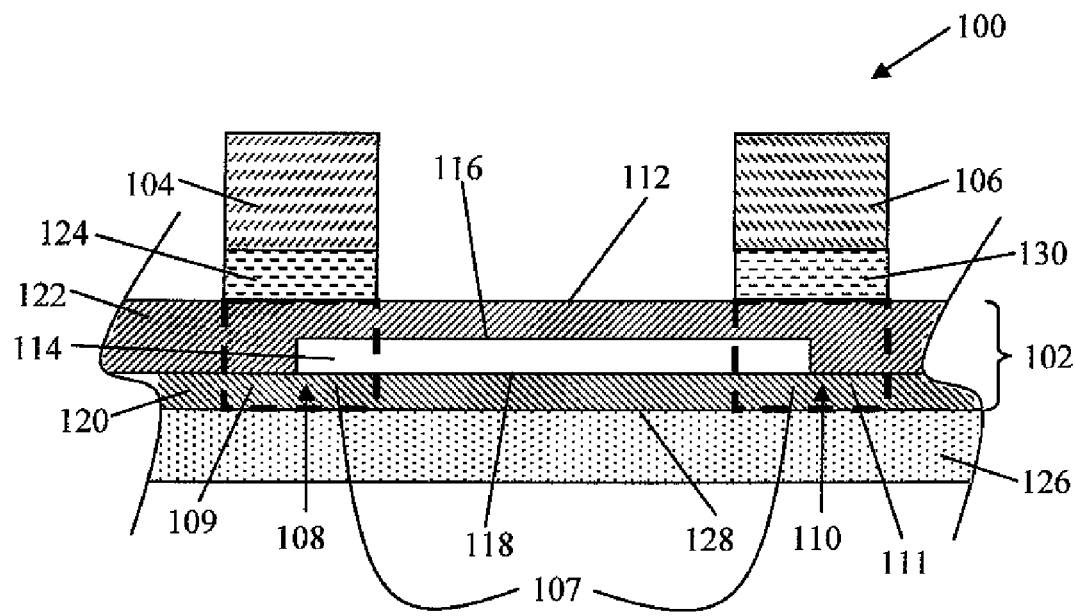
FIG. 1(f) shows a schematic diagram of another embodiment of the multi-layer structure of FIG. 1(d).
Figure 1G:
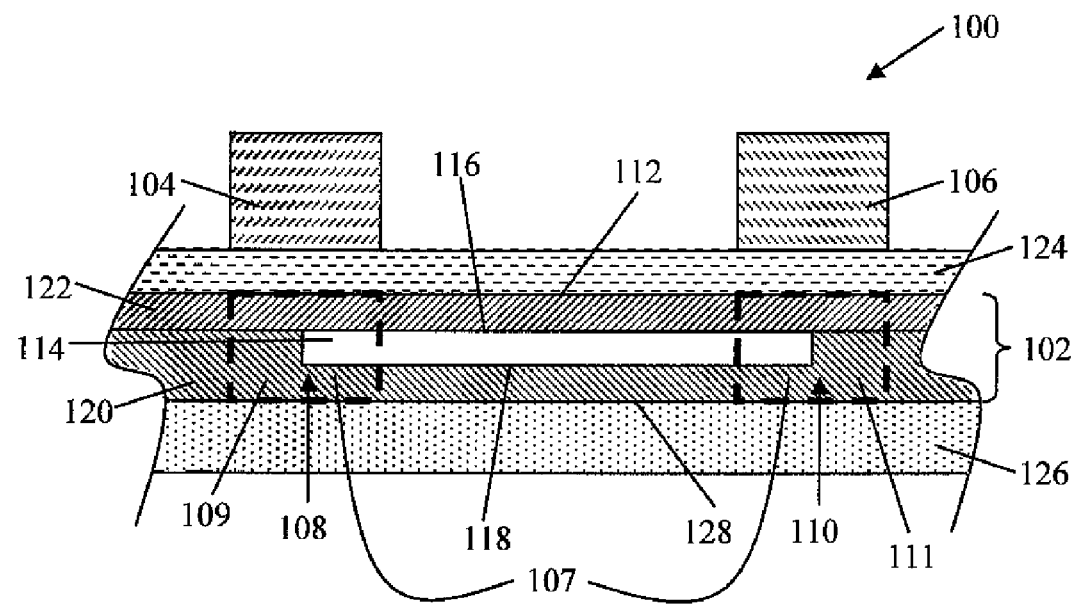
FIG. 1(g) shows a schematic diagram of another embodiment of the multi-layer structure of FIG. 1(a).
Figure 1H:
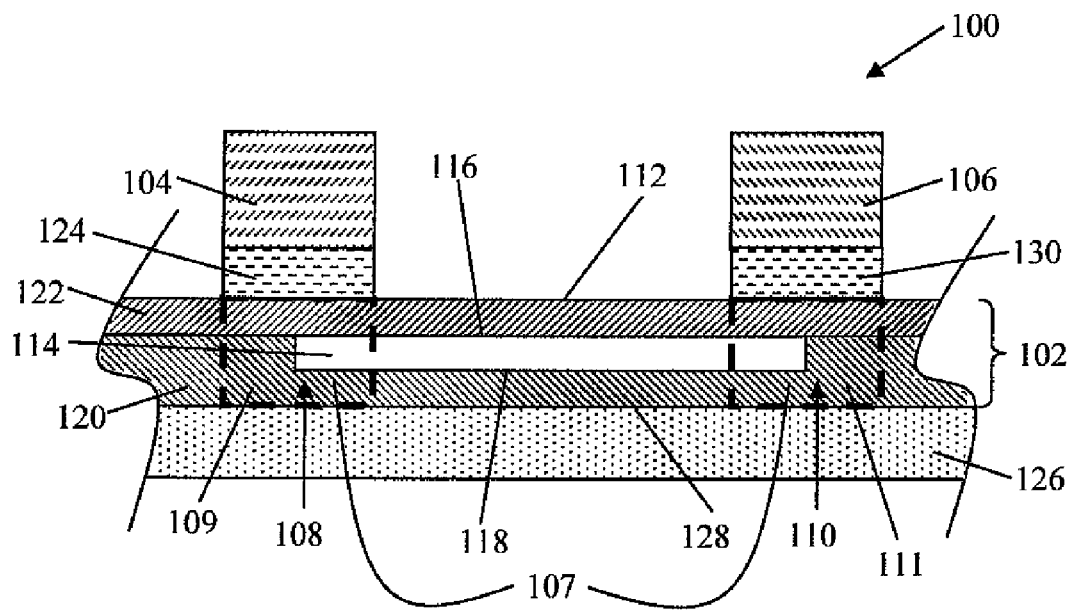
FIG. 1(h) shows a schematic diagram of another embodiment of the multi-layer structure of FIG. 1(d).

Further, for manufacturing the multi-layer structure 100 of FIGS. 1(d), 1(f) and 1(h) where the stacked layer 124 may be disposed between the light source 104 and the first light coupling module 108 and a further stacked layer 130 may be disposed between the photo detector 106 and the second light coupling module 110, the stacked layer 124 and the further stacked layer 130 may be deposited on the first surface 112 of the waveguide simultaneously in FIG. 5(h) instead.

FIG. 11(a) shows a schematic diagram of the multi-layer structure 100 implemented as e.g. a biosensor 1100. The biosensor 1100 may include antibody 1102 on a surface 1104 of the stacked layer 124 facing away from the waveguide 102. FIG. 11(b) shows a graph 1106 of intensity plotted against wavelength before the antibody 1102 interacts with antigen 1108. Before the antibody 1102 on the biosensor 1100 interacts with the antigen 1108, a resonance wavelength of the biosensor 1100 is at point 1110 of graph 1106.

FIG. 11(c) shows a schematic diagram of the antibody 1102 on the surface 1104 interacting with the antigen 1108. FIG. 11(d) shows a graph 1112 of intensity plotted against wavelength after the antibody 1102 interacts with the antigen 1108. After the antibody 1102 on the biosensor 1100 interacts with the antigen 1108, the resonance wavelength of the biosensor 1100 is at point 1114 of graph 1112.

Comparing graph 1106 of FIG. 11(b) and graph 1112 of FIG. 11(d), it can be observed that the resonance wavelength of the biosensor 1100 increases after the antibody 1102 interacts with the antigen 1108.

While embodiments of the invention have been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A multi-layer structure, comprising:
   a waveguide comprising one or more light coupling regions having a refractive index gradient;
   at least one organic material based active optical element disposed above the waveguide;
   wherein the one or more light coupling regions is configured to change characteristics of light propagating in the waveguide;
   wherein at least one of the one or more light coupling regions is configured to enhance light coupling between the waveguide and the active optical element.

2. The multi-layer structure of claim 1,
   wherein the one or more light coupling regions is configured to change one or more of the following characteristics of light propagating in the waveguide:
   light propagation direction;
   convergence of light;
   focusing of light;
   diffraction of light;
   divergence of light; and
   diffusion of light.

3. The multi-layer structure of claim 1, further comprising:
   at least two light coupling regions having the refractive index gradient.

4. The multi-layer structure of claim 3,
   wherein each light coupling region having the refractive index gradient is disposed below a respective organic material based active optical element.

5. The multi-layer structure of claim 1,
   wherein the at least one organic material based active optical element comprises a light source and/or a photo detector.

6. The multi-layer structure of claim 5,
   wherein the at least one organic material based active optical element comprises a light source;
   wherein the light source is configured as an organic light emitting diode.

7. The multi-layer structure of claim 5,
   wherein the at least one organic material based active optical element comprises a photo detector;
   wherein the photo detector is configured as an organic photo detector.

8. The multi-layer structure of claim 1,
   wherein the waveguide comprises organic material.

9. A method for manufacturing a multi-layer structure, the method comprising:
   forming a waveguide comprising one or more light coupling regions having a refractive index gradient;
   forming at least one organic material based active optical element above the waveguide;
   wherein the one or more light coupling regions is configured to change characteristics of light propagating in the waveguide;
   wherein at least one of the one or more light coupling regions is configured to enhance light coupling between the waveguide and the active optical element.

10. The method of claim 9, further comprising:
tuning the refractive index gradient of the one or more light coupling regions by emitting laser light to the waveguide.

11. The method of claim 10,
wherein tuning the refractive index gradient of the one or more light coupling regions comprises laser direct writing.

12. The method of claim 9,
wherein tuning the refractive index gradient of the one or more light coupling regions comprises distributing different amounts of metal ions or nanoparticles along the one or more light coupling regions.

13. The method of claim 9,
wherein tuning the refractive index gradient of the one or more light coupling regions comprises changing a degree of polymer cross-linking along the one or more light coupling regions.

14. The method of claim 9,
wherein tuning the refractive index gradient of the one or more light coupling regions comprises changing molecular bonding of polymer along the one or more light coupling regions.

15. The method of claim 9,
wherein tuning the refractive index gradient of the one or more light coupling regions comprises generating an electric field across electro-opto materials along the one or more light coupling regions.

16. The method of claim 9,
wherein tuning the refractive index gradient of the one or more light coupling regions comprises generating a temperature gradient across thermal-opto materials along the one or light coupling more regions.

* * * * *